US008996157B2

(12) United States Patent
Collin

(10) Patent No.: US 8,996,157 B2
(45) Date of Patent: Mar. 31, 2015

(54) STATION FOR PREPARING ORDERS COMPRISING AT LEAST ONE SHAFT FOR VERTICALLY ACCUMULATING AND SEQUENTIALLY DISPENSING CONTAINERS

(75) Inventor: Jean-Michel Collin, Merceuil (FR)

(73) Assignee: Savoye, Dijon (FR)

( * ) Notice: Subject to any disclaimer, the term of this patent is extended or adjusted under 35 U.S.C. 154(b) by 0 days.

(21) Appl. No.: 13/985,016

(22) PCT Filed: Feb. 9, 2012

(86) PCT No.: PCT/EP2012/052243
§ 371 (c)(1),
(2), (4) Date: Oct. 28, 2013

(87) PCT Pub. No.: WO2012/107534
PCT Pub. Date: Aug. 16, 2012

(65) Prior Publication Data
US 2014/0039667 A1    Feb. 6, 2014

(30) Foreign Application Priority Data

Feb. 11, 2011    (FR) ..................... 11 51153

(51) Int. Cl.
*G06F 7/00*    (2006.01)
*B65G 1/04*    (2006.01)
(Continued)

(52) U.S. Cl.
CPC ............... *B65G 1/04* (2013.01); *B65G 1/0485* (2013.01); *B65G 1/127* (2013.01); *B65G 1/1378* (2013.01)
USPC ........... 700/215; 700/213; 700/214; 700/216; 700/217; 700/218; 700/220; 700/221; 700/223; 700/224; 700/225; 700/226; 700/228; 700/229; 700/230

(58) Field of Classification Search
CPC  G11B 15/6835; A47J 37/1228; B65B 43/305
See application file for complete search history.

(56) References Cited

U.S. PATENT DOCUMENTS

| 4,909,697 A | 3/1990 | Bernard, II et al. |
| 5,529,165 A | 6/1996 | Shupert |
| 5,595,263 A | 1/1997 | Pignataro |

FOREIGN PATENT DOCUMENTS

| CH | 678940 A5 * 11/1991 |
| DE | 10225332 A1 * 1/2004 |

(Continued)

OTHER PUBLICATIONS

International Preliminary Report on Patentability and English translation of the Written Opinion dated Aug. 13, 2013 for corresponding International Application No. PCT/EP2012/052243, filed Feb. 9, 2012.

(Continued)

*Primary Examiner* — Yolanda Cumbess
(74) *Attorney, Agent, or Firm* — David D. Brush; Westman, Champlin & Koehler, P.A.

(57) ABSTRACT

There is proposed a unit including a station for preparing orders, controlled by a control system. The station has a first circuit that includes a first outward conveyor, which receives containers for storing products, and an accumulator for accumulating a predetermined quantity of storage containers received on the first outward conveyor. The accumulator includes: at least one first shaft comprising superposed mobile positions that can each receive and downwardly move at least one storage container, the at least one first shaft vertically accumulating and sequentially dispensing storage containers previously placed in the positions; and at least one first elevator moving vertically along the at least one first chute up to each of the locations of the at least one first chute.

17 Claims, 11 Drawing Sheets

(51) Int. Cl.
*B65G 1/127* (2006.01)
*B65G 1/137* (2006.01)

(56) References Cited

FOREIGN PATENT DOCUMENTS

| JP | 55002808 U | 1/1980 |
| JP | 57081004 | 5/1982 |
| JP | 4116001 | 4/1992 |
| JP | 2001088908 | 4/2001 |

OTHER PUBLICATIONS

International Search Report and Written Opinion dated May 22, 2012 for corresponding International Application No. PCT/EP2012/052243, filed Feb. 9, 2012.

French Search Report and Written Opinion dated Sep. 27, 2011 for corresponding French Application No. 1151153, filed Feb. 11, 2011.

* cited by examiner

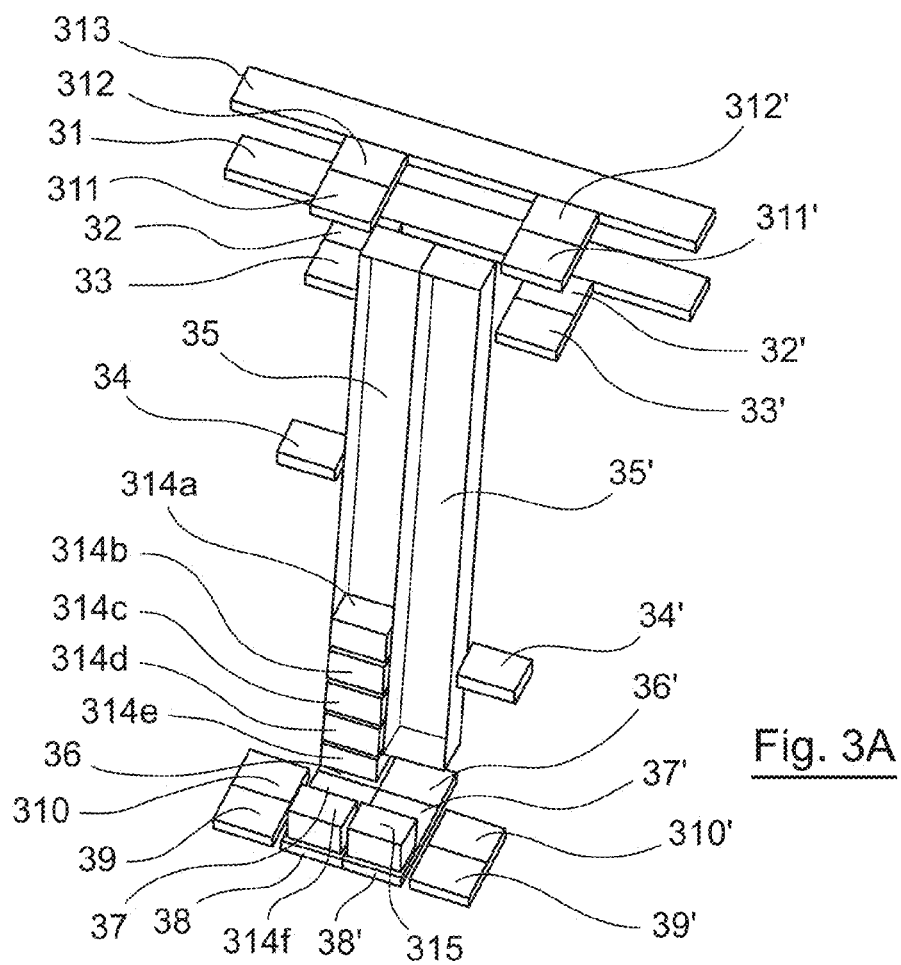
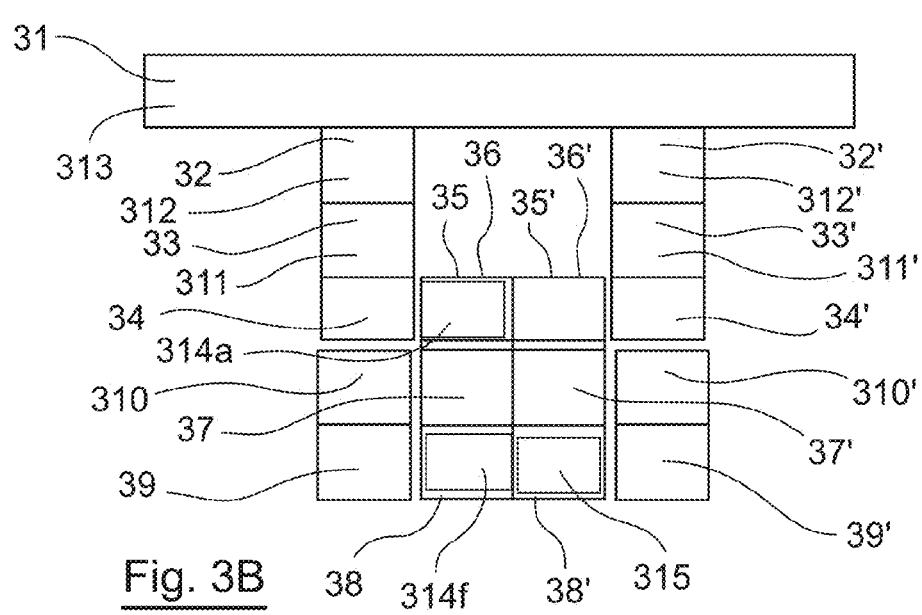

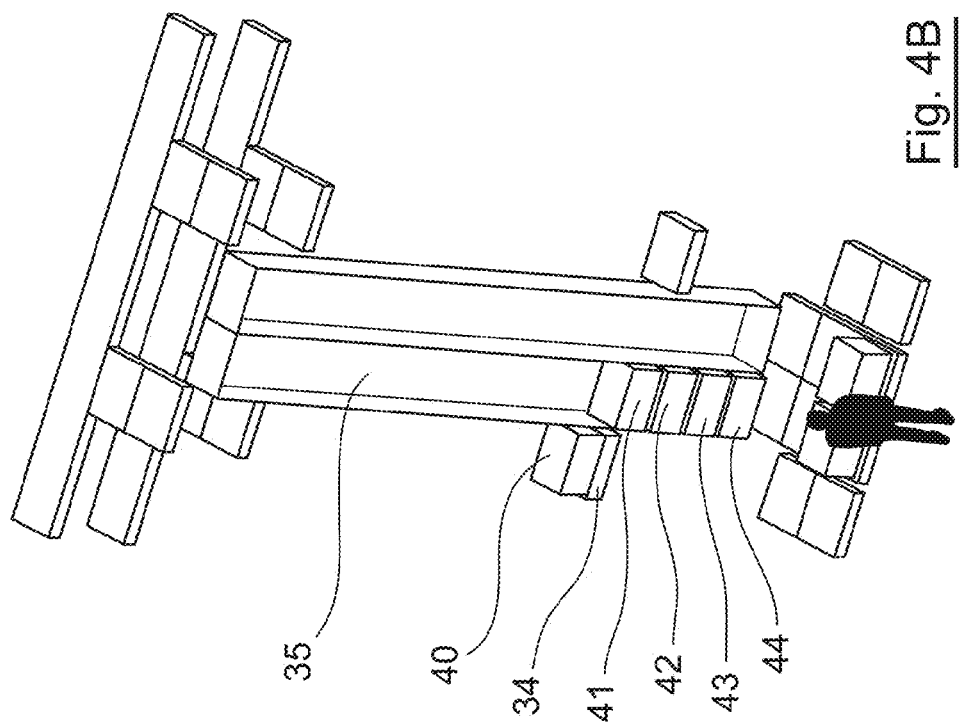
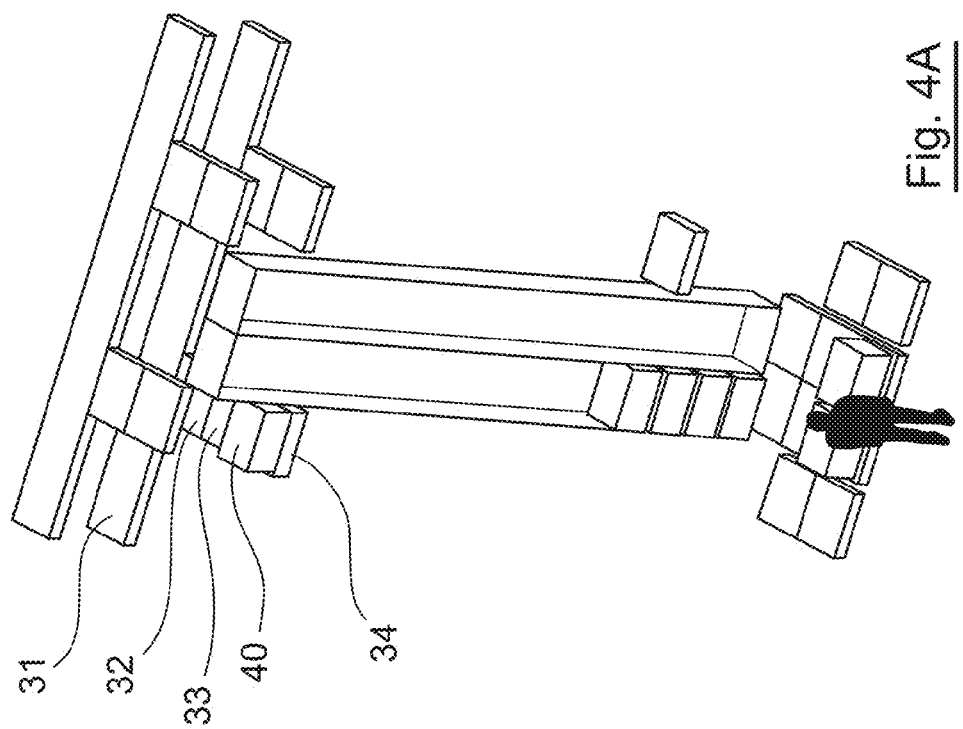

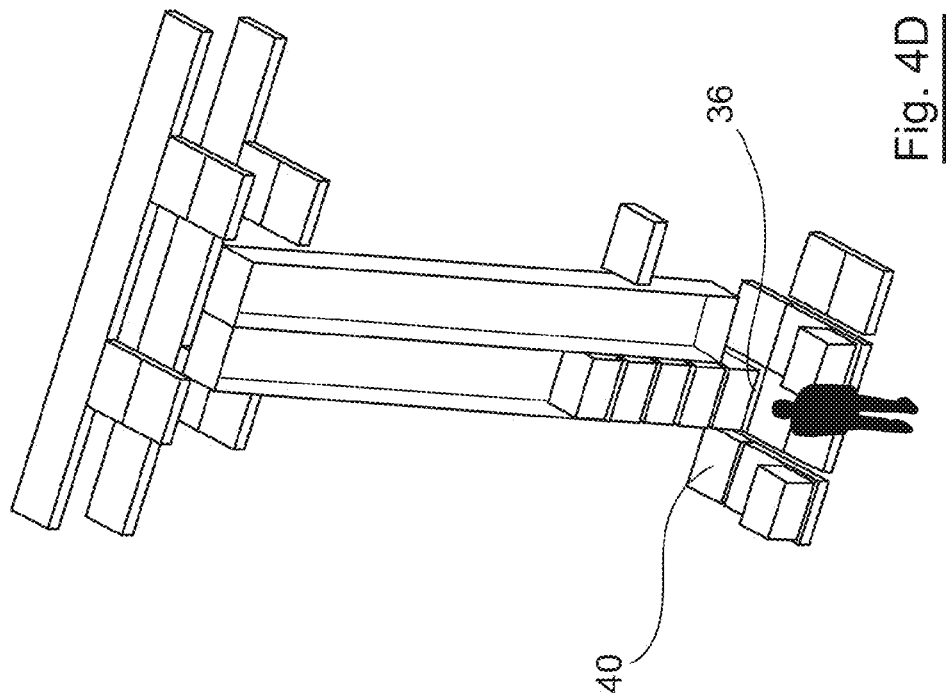
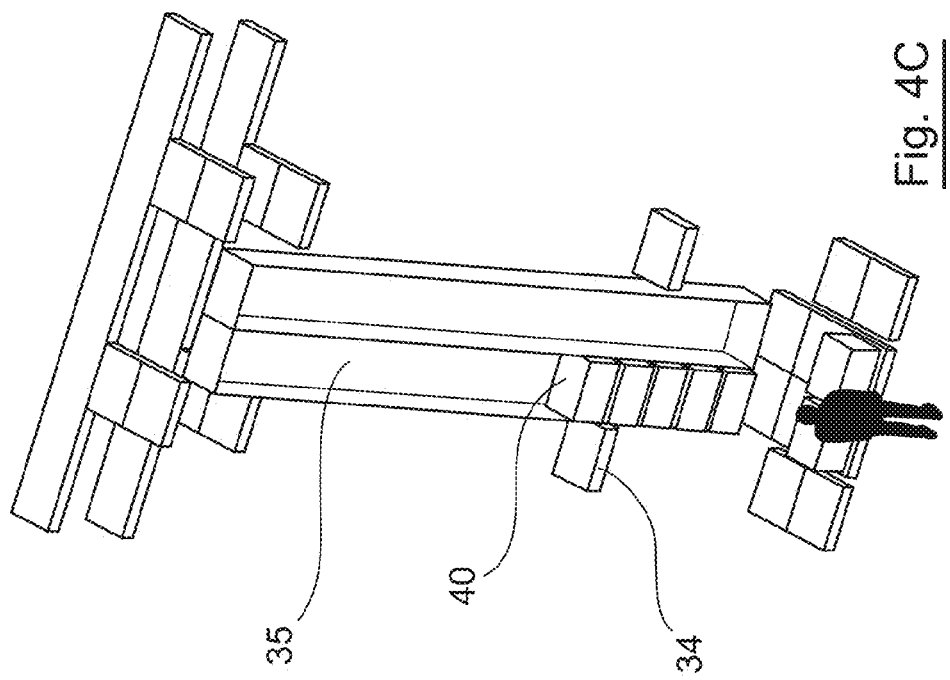

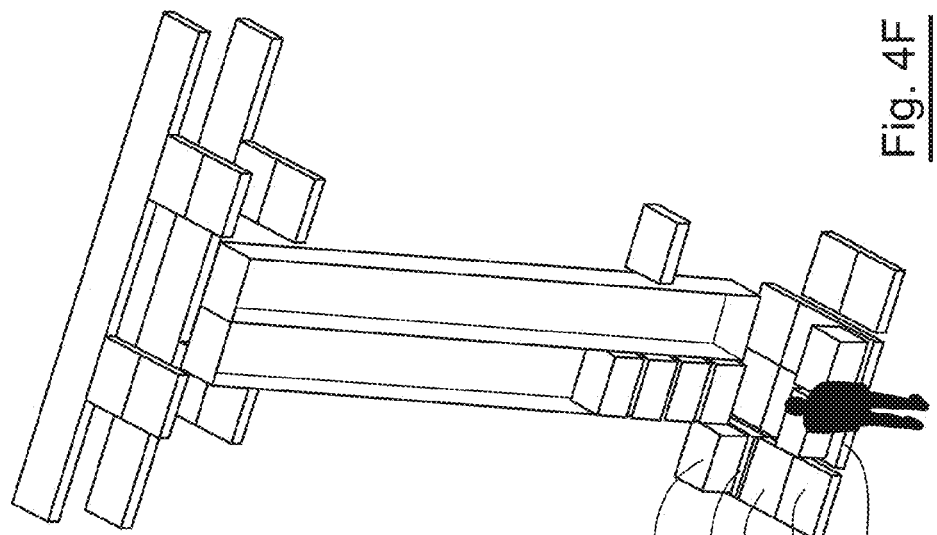
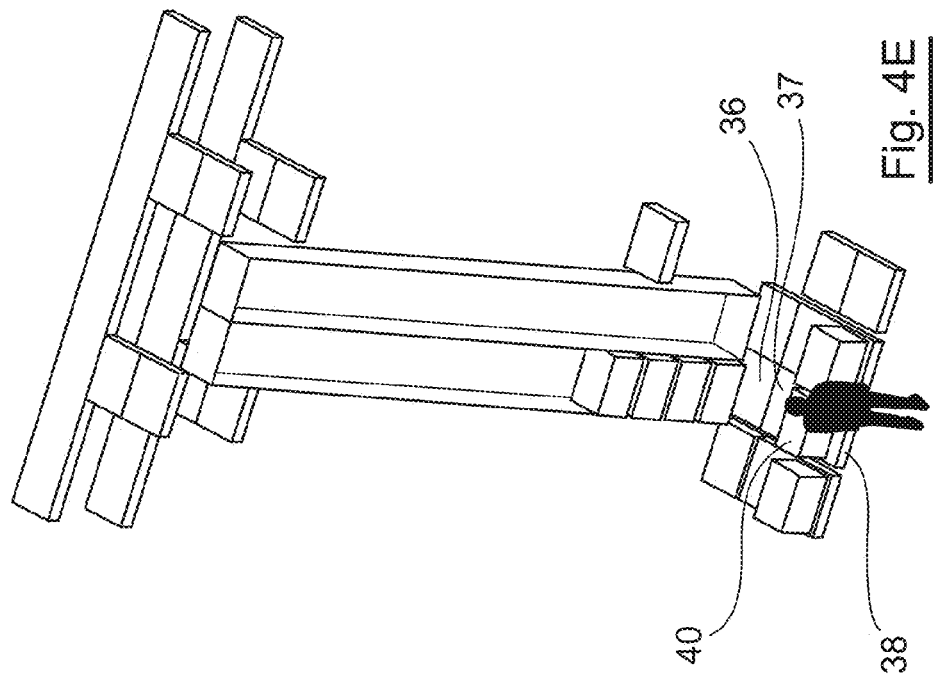

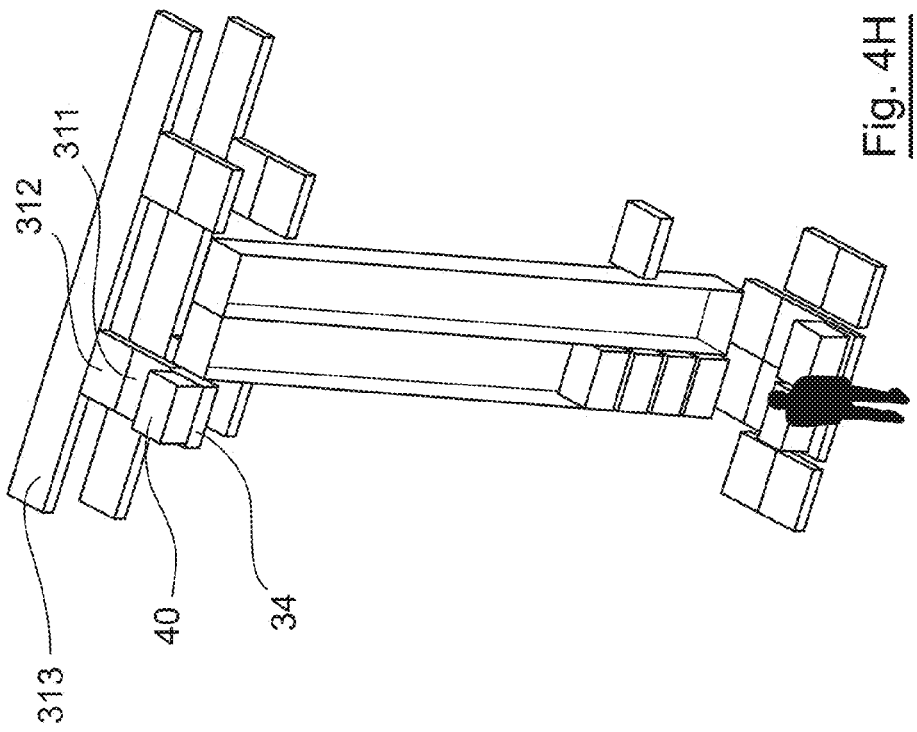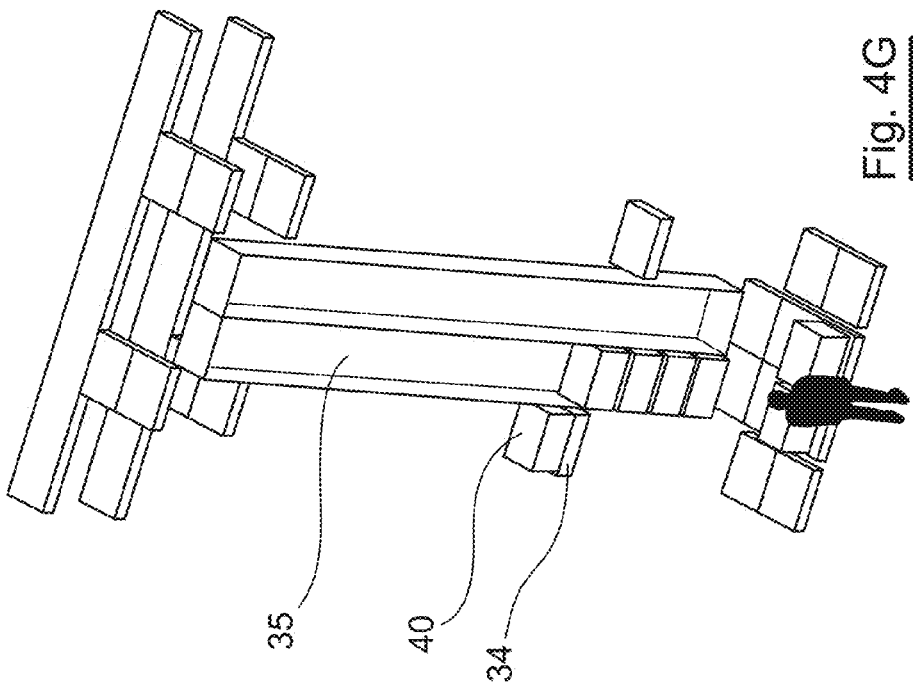

STATION FOR PREPARING ORDERS COMPRISING AT LEAST ONE SHAFT FOR VERTICALLY ACCUMULATING AND SEQUENTIALLY DISPENSING CONTAINERS

1. CROSS-REFERENCE TO RELATED APPLICATIONS

This application is a Section 371 National Stage Application of International Application No. PCT/EP2102/052243, filed Feb. 9, 2012, which is incorporated by reference in its entirety and published as WO 2012/107534 on Aug. 16, 2012, not in English.

2. FIELD OF THE INVENTION

The field of the invention is that of logistics and warehouses. It may be recalled that a warehouse is a logistics building for storing goods for shipment to a customer. The main processes applied in a warehouse are those of receiving orders, storage, preparing or picking orders, dispatch and stock management.

The present invention pertains more specifically to an order-preparing (or order-picking) station especially but not exclusively when this station forms part of an automated storage system comprising a storage depot and one or more order-preparing stations.

The present invention can be applied to all types of order preparation and especially:
  preparing orders by picking products or goods from storage containers: an operator (or an automaton, i.e. a robot) receives a pick list (on paper, on a screen of a terminal or again in voice form) informing him, for each package to be shipped (also called a shipping container), of the quantity of each type of goods that he must collect in the storage containers and put together in the packages to be distributed; and
  preparing orders by palletization of storage containers themselves containing goods: an operator (or an automaton) receives a pick list (on paper, on the screen of a terminal, in voice form, or again in the form of a computer task in the case of the automaton) informing him, for each pallet to be shipped (also called a shipping container), of the quantity of each type of storage containers (for example cardboard boxes) that he must collect on or remove from the pallet to be shipped.

Generally, two types of stations for preparing orders can be distinguished: stations with movements and fixed stations.

The stations with movements apply the "man to goods" principle in which the preparer moves up to the picking place and there picks the number of goods ordered.

Fixed stations apply the "goods to man" principle in which the storage containers (for example cardboard boxes or trays), each containing goods of a given type, are automatically taken out of a storage depot (on transfer devices called trolleys or shuttles) and arrive before or in proximity to the preparer who must pick the number of goods ordered out of each trolley or a shuttle.

This distinction between stations with movement and fixed stations also applies in the case of palletization: either the preparer moves to find the storage containers to be unloaded onto the pallet to be shipped or the storage containers are brought automatically to the preparer (for example by a stacker crane).

The present invention is situated in the case of a fixed station for preparing orders.

In the present description, the term "elevator" is understood to mean any system used to take one or more loads (storage or shipping container or containers) at a given level and from there, to deposit them at another level.

3. TECHNOLOGICAL BACKGROUND

To implement the "goods to man" principle, fixed stations for preparing orders generally have a special configuration and must implement several functions, such as for example (without this list being exhaustive):
  obtaining supplies two types of loads, namely storage containers (containing products that will be used to prepare the orders) and shipping containers (in which or on which the goods to be shipped will be placed according to the orders);
  removing both types of loads, namely storage containers (except in the case of palletization where it is the storage container itself that is placed on the pallet forming the shipping container) and shipping containers (after they have been filled—or loaded in the case of palletization—according to the orders);
  synchronization between two different types of flows, one for storage containers and the other for the shipping containers;
  accumulating a quantity of loads (i.e. a determined number of storage containers and/or shipping containers) upstream to the operator (or automaton) according to the configuration of the preparing station;
  weighing operation performed on one of the two types of loads or on both loads (this weighing function enables the preparing operation to be checked);
  classic preparation (the operator picks goods from the storage containers that pass before him and places the picked goods into the shipping containers) and reverse preparation (the operator picks goods from the storage containers that pass before him, the storage containers whose content is thus modified becoming the shipping containers);
  exclusion (the possibility of removing a storage container out of an automatic storage depot);
  re-procuring supplies of goods (possibility of re-entering a storage container into an automatic storage depot);
  inventorying (for example the storage containers are brought out of an automatic storage depot and then made to pass through the preparing station in order to know exactly which goods that contain, and finally they are stowed again in the automatic storage depot);
  etc.

Referring now to FIG. 1, we present a top view of an example of a known configuration for an automated storage system for preparing packages comprising:
  a storage depot 7 comprising several (two in this example) assemblies each formed by an alley (or track) 7*a*, 7*a*' serving on either side a storage shelf 7*b*, 7*c*, 7*b*', 7*c*' with several superimposed stowage levels. Each shelf is subdivided on its length into storage locations, each intended for receiving one container (trays or cardboard boxes for example) for storing goods. At each stowage level, each alley receives paths for moving a trolley (also called a shuttle) which shifts the storage containers and places them inside or removes them from the storage locations. The trolleys can move horizontally at a given stowage level, as well as vertically from one level to another of an alley by elevators each placed at one end of an alley;

a set of conveyors taking the storage containers from the storage depot up to the preparing stations and vice versa. In the example of FIG. 1, three sub-assemblies of conveyors can be distinguished: the first (referenced 9) is placed immediately at the exit from the depot 7 and comprises conveyors placed in the axis of the storage shelves; the second (referenced 16) comprises conveyors placed perpendicularly and after those of the first sub-assembly; the third (referenced 8) comprises conveyors placed perpendicularly and after those of the second sub-assembly, as well as along one of the storage shelves 7b of the depot 7. The running surface height (RSH) of the conveyors used in the sub-assemblies 6, 7 and 8 generally ranges from 750 to 1750 mm;

several (six in this example) order-preparing stations 10a, 10b, 10c, 10d, 10e and 10f each occupied by one operator 1a, 1b, 1c, 1d, 1e and 1f and extending perpendicularly to the conveyors of the above-mentioned third sub-assembly 8. An example of a configuration of a preparing station is described in detail here below;

a central management computer system (not shown) (also called a steering or managing system) responsible for managing the entire automated storage system (storage depot, set of conveyors and preparing stations). It also manages the list of orders associated with each shipping container (packages) and therefore the order of the order lines forming this list according to the location of the storage containers in the storage depot, the availability of the trolleys and elevators of the storage depot as well as requirements in goods for the different shipping containers (packages) to be prepared that succeed one another other at the preparing station. This is aimed at optimizing all the movements and the times of preparation of the shipping containers (packages) and providing for synchronization between the arrival, at the preparing station, of a shipping container (package being prepared) and the storage containers (containing goods indicated in the order list associated with this storage container).

In one embodiment, each preparing station comprises the following (the references given here below are those of the elements of the station referenced 10a):

a first circuit of conveyors for the storage containers formed by two horizontal columns of conveyors: one (outbound column 2) for moving the storage containers from the third sub-assembly of conveyors 8 to the operator 1a and the other column (return column 3) for the reverse movement; and a second circuit of conveyors for the shipping containers formed by two horizontal columns of conveyors: one (outbound column 4) for moving the shipping containers from the third sub-assembly of conveyors 8 to the operator 1a, and the other column (return column 5) for the reverse movement.

In each of the first and second circuits, the outbound columns 2 and 4 (formed by classic horizontal conveyors) perform the function of collecting a determined quantity of containers upstream to the operator (or automaton).

A storage container takes the following route: it is picked up by a trolley in the storage depot 7 then conveyed successively by the conveyors of the first, second and third sub-assemblies 9, 6 and 8 and then by the conveyors of the outbound column 2 and is then presented to the operator. In the other sense (after being presented to the operator), the storage conveyor takes the reverse route: it is conveyed by the conveyors of the return column 3, and then successively by the conveyors of the third, second and first sub-assemblies 9, 6 and 8 and finally placed again in the storage depot 7 by a trolley.

It must be noted that the storage containers must be presented in an order to the operator. The same is the case for the predetermined shipping containers. Furthermore, as already indicated here above, the flow of storage containers must be synchronized with the flow of shipping containers. Typically, for a given shipping container taken before the operator (for example to his left), several storage containers containing goods that he must pick up and place in the given shipping container are made to file past him.

In order to relax constraints at the storage depot, it is accepted that the containers (storage containers or shipping containers) do not exit the storage depot in the order in which they have to be presented to the operator. It is therefore necessary to perform an operation for sequencing the containers between the storage depot and the preparing station in which the operator is situated. In the example of FIG. 1, this sequencing operation is performed by the second sub-assembly of conveyors 6 which itself performs a buffer role: the storage containers circulate therein in a loop and when the storage container expected on the conveyors of the outbound column 2 arrives before this column (in order to make the full complement of the sequence of storage containers awaited at the preparing station), this container is transferred to the conveyors of the outbound column 2, the other storage containers continuing to circulate on the second sub-assembly of conveyors 6. This method is performed for each of the storage containers expected in a predetermined order of arrival at the preparing station.

Classically, this order of arrival is predetermined (i.e. determined for each container before this container reaches the preparing station) by the managing or steering system and, if necessary, recomputed during the routing of the containers from the output of the storage depot to the preparing station in which the operator is situated (for example to take account of a malfunction in an element of the system).

The running surface height (RSH) of the conveyors used in these first and second circuits is generally 750 mm.

In the example illustrated in FIG. 1, the return column for the shipping containers 5 is common to the preparing stations referenced 10a and 10b (these two adjacent stations are configured symmetrically relative to each other, the common column forming an axis of symmetry). This is also the case for the adjacent preparing stations referenced 10c and 10d as well as for those referenced 10e and 10f. This reduces the footprint of the preparing stations.

Unfortunately, despite this solution, the current approach based on classic horizontal conveyors (as described here below with reference to FIG. 1) has several drawbacks.

First of all, it consumes an excessive amount of $m^2$ for a small running surface height (750 mm typically). As an example of this excessive footprint, the surface area needed for six order-preparing stations (as in the example of FIG. 1) is in the range of 100 $m^2$.

Another drawback is that classic horizontal conveyors in the preparing stations have such density on the ground that it makes it difficult to obtain maintenance access to these conveyors (the conveyor area is far too dense).

Another drawback is that, without even further increasing the footprint of the preparing station (by increasing the length of the outbound column of each of the first and second circuits), it is not possible to increase the number of containers that can accumulate upstream from the operator (or automaton).

Yet another drawback is that, in certain configurations, the footprint of the preparing stations prevents or makes it difficult to obtain maintenance access to the trolleys (also called shuttles) used in the storage depot. The maintenance of these trolleys then sometimes makes it necessary to access the storage depot from the rear with a girder system (referenced 11 in FIG. 1) which is not ergonomic.

Yet another drawback is that it is not possible to obtain optimal processing when one and the same container has to be presented to the operator several times in succession. For example, for two distinct orders, the operator must pick an item from a given storage container and place it in a first shipping container and then, a few moments later (and after one or more other storage containers have been presented to him), the operator must pick another item from the same given storage container and place it in a second shipping container. Indeed, going back to this same example, currently, the second sub-assembly of conveyors 6 is used for an operation to introduce the given storage container into the outbound column 2 of the first circuit of the preparing station (10a for example). This is not optimal because the time interval between two successive presentations of the same container to the operator cannot be small: it is the time taken by this container to travel throughout the next circuit: i.e. it has to travel through the conveyors of the return column 3, then the conveyors of the second sub-assembly of conveyors 6 and finally the conveyors of the outbound column 2. In practice, if this time interval is too great, then two storage containers containing the same type of goods required for the two orders involved are made to exit the storage depot. The number of motions performed by the storage depot is thus increased, which is not a satisfactory solution. Moreover, to manage this increase in the number of motions performed by the storage depot, the number of alleys of the storage depot is generally increased (so as not to exceed a maximum capacity of entries/exits that can be made by the elevator or elevators placed at each end of an alley).

4. SUMMARY OF THE INVENTION

A station is proposed for preparing orders, managed by a managing system and possessing a first circuit comprising a first outbound conveyor, receiving containers for storing goods, and first means for accumulating a determined quantity of storage containers received by the first outbound conveyor. Said first means for accumulating comprise:
- at least one first chute comprising superimposed mobile locations each capable of receiving and moving at least one storage container downwards, said at least one first chute forming a means for vertically accumulating and sequentially distributing, in a predetermined order, storage containers preliminarily placed in the locations; and
- at least one first elevator, capable of moving vertically along said at least one first chute up to locations of said at least one first chute selected as a function of said predetermined sequence, enabling storage containers coming from the first outbound conveyer to be made to enter said selected locations of said at least one first chute.

The general principle of the invention therefore consists in carrying out, within an order-preparing station, a vertical accumulation of storage containers through (at least) one structure (called a chute or a shaft) further fulfilling a function of sequentially distributing the storage containers. Thus, the proposed solution has several advantages and makes it possible especially to:

- reduce the footprint of the order-preparing stations;
- facilitate maintenance access to the elements included in the preparing station (there is no excessively dense stretch of conveyors);
- increase the number of containers that can be accumulated without any negative impact on the footprint of the preparing station; and
- facilitate maintenance access for trolleys used in the storage depot.

In a first application, the first circuit further comprises:
- first means for presenting an operator or an automaton with storage containers exiting said at least one first chute;
- first means of removal, enabling the transfer to said at least one first elevator of at least certain of the storage containers after they have been presented to the operator or the automaton;
- a first return conveyor, receiving storage containers coming from the first means of removal via said at least one first elevator.

Thus, in this first application, the storage containers are presented to an operator or an automaton downstream from said at least first chute, and said at least one first elevator is used upstream and downstream from said at least one first chute.

According to a particular characteristic of the first application, the order-preparing station possesses a second circuit comprising:
- a second outbound conveyor receiving goods shipping containers;
- second means for accumulating a determined quantity of shipping containers received by the second outbound conveyor, said second accumulating means comprising:
  - at least one second chute comprising superimposed mobile locations each of which can receive and move at least one shipping container downwards, said at least one second chute forming a means for vertically accumulating and sequentially distributing shipping containers preliminarily placed in the locations;
  - at least one second elevator enabling shipping containers coming from the second outbound conveyor to enter said at least one second chute;
- second means for presenting the operator or automaton with shipping containers exiting from said at least one second chute.

In other words, the general principle evoked here above for the storage containers can also be applied to the shipping containers.

According to one particular characteristic of the first application, the second circuit furthermore comprises:
- second means of removal, enabling the transfer to said at least one second elevator of at least certain of the shipping containers after they have been presented to the operator or the automaton;
- a second return conveyor receiving shipping containers coming from second means of removal via said at least one second elevator.

According to a second application, the first circuit further comprises means of palletization making it possible to place, on pallets or other supports, storage containers exiting said at least one first chute.

Thus, in this second application, a layered palletization is achieved downstream from said at least one first chute.

In one particular embodiment, the order-preparing station comprises means for reading an identifier carried by a given storage container coming from the first outbound conveyor, and the managing system makes it possible to:
- select one of the locations of said at least one first chute, as a function of the identifier read and a predetermined sequence defining the order in which the storage containers must exit said at least one first chute;

manage said at least one first elevator in order to make the given storage container enter the selected location.

Thus, said at least one first chute makes it possible to carry out a re-scheduling of the storage containers. It may be recalled that, in general, the storage containers do not reach the preparing station (i.e., for example, they do not exit the storage depot) in the order in which they must be presented to the operator or to the palletizing means. The (re-) scheduling capacity is related to the quantity of storage containers that can be stored temporarily in said at least one first chute.

According to one particular characteristic of the first application, the order-preparing station comprises means for reading an identifier borne by a given shipping container coming from the second outbound conveyor, and the managing system makes it possible to:

select one of the locations of said at least one second chute, as a function of the identifier read and a predetermined sequence defining the order in which the shipping containers must exit said at least one second chute;

manage said at least one second elevator in order to make said given shipping container enter the selected location.

Thus, said at least one second chute makes it possible to carry out a (re-) scheduling of the shipping containers.

According to one particular characteristic of the first application, the managing system makes it possible to manage said at least one first elevator in order to leave free one of the locations of said at least one first chute and to make a storage container, coming from the first removal means, enter the location that is left free.

Thus, it is easy to present a same storage container to the operator several times successively. Indeed, a loop passing through said at least one first chute is used. This makes it possible to have a short time interval between two successive presentations of the same storage container to the operator (there is therefore no need to make two storage containers containing the same type of goods exit the storage depot and therefore no need to increase the number of movements performed by the storage depot and no need to increase the number of alleys of the storage depot).

Advantageously, the order-preparing station comprises at least one first buffer storage structure comprising fixed locations, each capable of receiving at least one storage container and the managing system enables said at least one first elevator to be managed in order to temporarily store storage containers in said at least one first buffer storage structure.

Thus, said at least one first buffer storage structure (also called a rack here below) makes it possible to increase the buffer storage capacity upstream to said at least one first chute (and therefore the capacity for (re-)scheduling the storage containers) and/or downstream from said at least one first chute (and therefore the capacity for successive presentations of the same storage containers to the operator).

According to one particular characteristic, each elevator can transport at least two containers side by side and/or at least two superimposed containers. Thus, the use of each elevator is optimized and the container flow rate is increased.

According to one particular characteristic, at least one chute cooperates with at least two elevators. Thus, the use of this chute is optimized.

According to one special characteristic, at least one elevator cooperates with at least two chutes. Thus, the use of this elevator is optimized.

According to one particular characteristic of the first application, among said at least one first chute and said at least one second chute, at least one shared chute receives storage containers and shipping containers.

Furthermore, the managing system enables the first and second presentation means to be managed so that they cooperate to present the operator or the automaton with storage containers and shipping containers exiting said at least one shared chute.

Thus, a shared chute is used both for storage containers and for shipping containers, thus optimizing its use (for example if the flow rate of storage containers is far greater than the flow rate of shipping containers or conversely).

In one particular embodiment, at least one chute comprises two notched belts equipped with synchronized pegs. This embodiment is simple to implement and costs little.

Advantageously, each conveyor (outbound conveyor, return conveyor) is placed in an overhead position, at least two meters from the ground. Thus, the footprint of the order-preparing station is reduced.

According to one particular characteristic of the first application, the managing system can be used to manage the first means for presenting so that they form a first carousel for the circulation of storage containers, enabling a given storage container to be presented to the operator or the automaton at least twice without making the same given storage container pass again through said at least one first chute.

Thus, there is an additional possibility (apart from that provided by the reintroduction of a storage container into said at least one chute) of presenting a same storage container several times in succession to the operator. This makes it possible to have a very short time interval between the successive presentations of the same storage container to the operator (there is therefore no need to make two storage containers containing the same type of goods exit the storage depot and therefore no increase in the number of movements performed by the storage depot and no increase in the number of alleys of the storage depot).

According to one particular characteristic of the first application, the managing system makes it possible to manage the second means for presenting so that they form a second carousel for the circulation of shipping containers, making it possible to present a given shipping container to the operator or the automaton at least twice, without making said given shipping container pass again through said at least one second chute.

Thus, it is possible to present a same shipping container to the operator several times successively.

In one particular embodiment, the managing system makes it possible to adopt an order-preparing mode belonging to the group comprising:

a first mode in which for a same shipping container presented to the operator or automaton, the first carousel enables the operator or automaton to be presented with several storage containers successively;

a second mode in which, for a same storage container presented to the operator or automaton, the second carousel enables the operator or the automaton to be presented with several shipping containers successively;

a third mode in which, for a pair of given storage and shipping containers, the first carousel enables the operator or the automaton to be presented with the given storage container and the second carousel enables the operator or the automaton to be presented with the given shipping container.

The invention also proposes a system of automated storage comprising a storage depot and at least one order-preparing station as mentioned here above (in any one of its embodiments).

5. LIST OF FIGURES

Other features and advantages shall appear from the following description, given by way of a non-exhaustive indication and from the appended drawings, of which:

FIG. 1, already described with reference to the prior art, presents a top view of an automated storage system comprising classic order-preparing stations in which the accumulating function is achieved with a set of horizontal conveyors;

FIGS. 3A and 3B show a view in perspective and a top view respectively of one of the order-preparing stations of FIG. 2, according to the first embodiment of the invention;

FIGS. 4A to 4H illustrate the working of the order-preparing station of FIGS. 3A and 3B;

Figure 5:
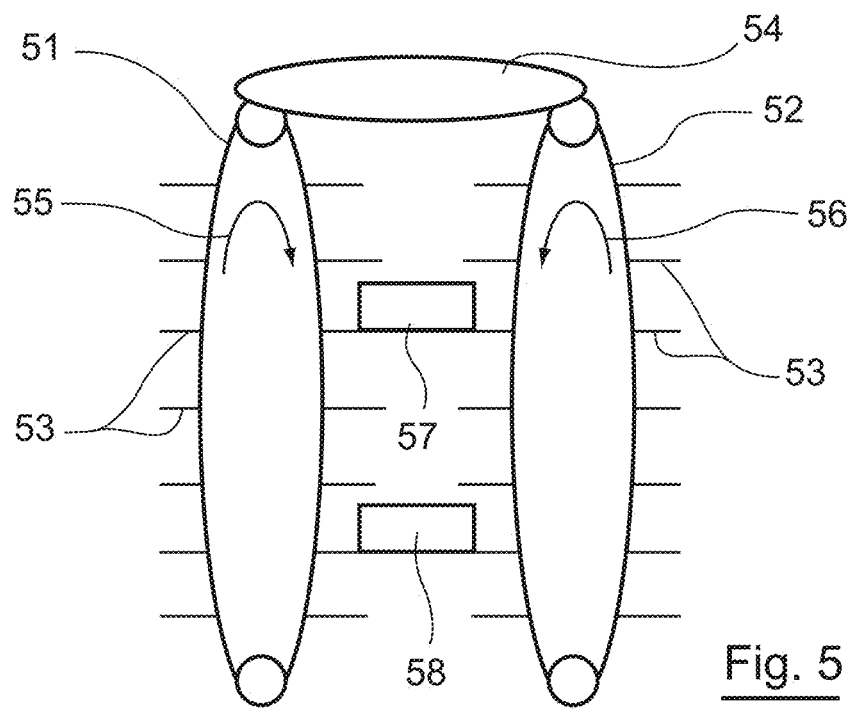
Figure 6:
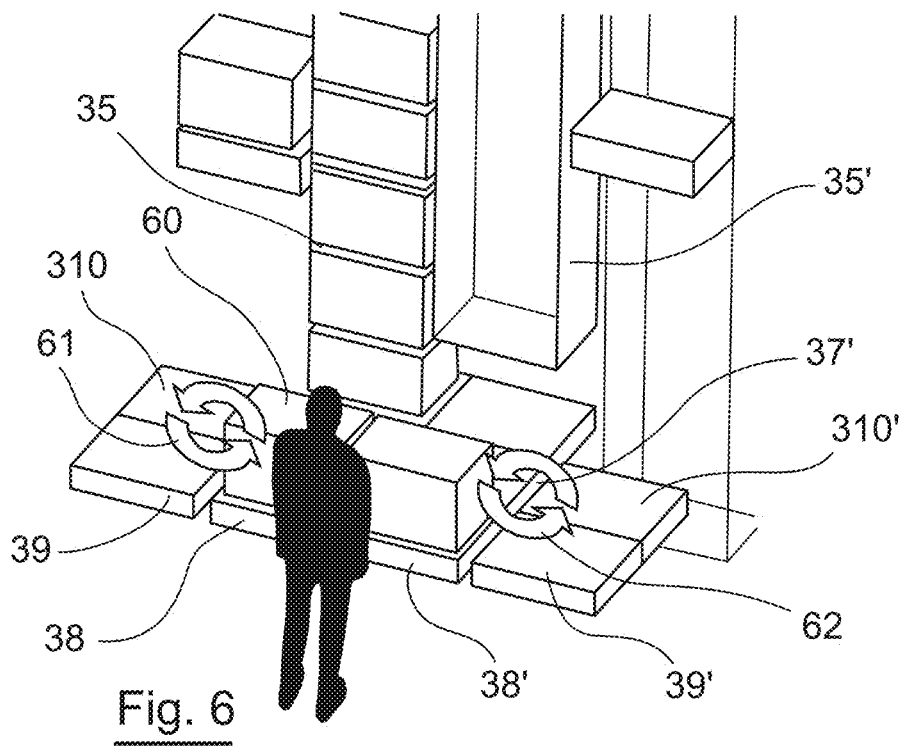
Figure 7A:
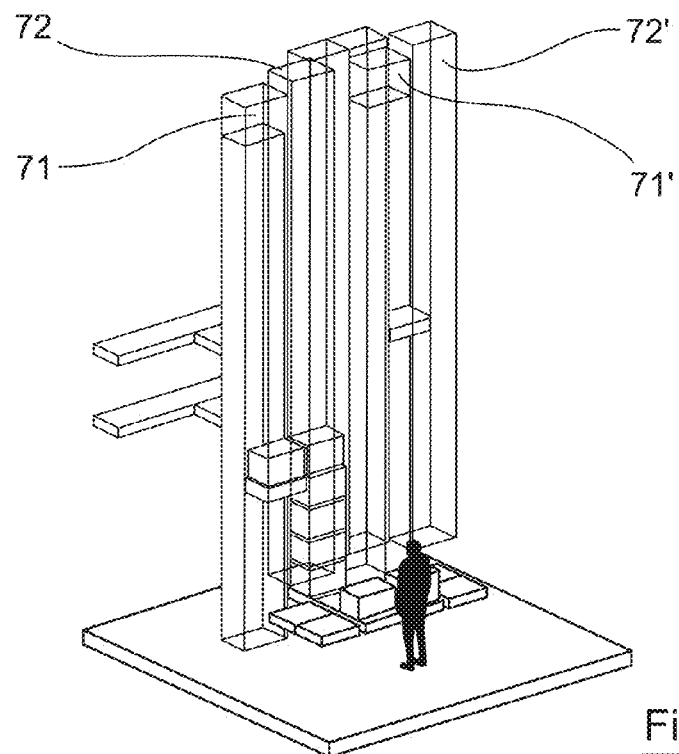
Figure 7B:
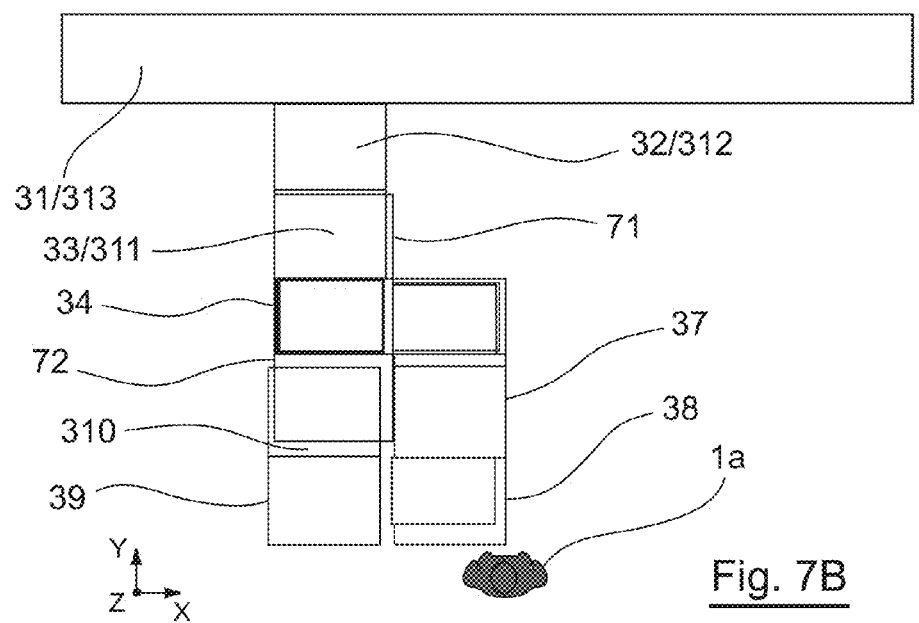
Figure 8A:
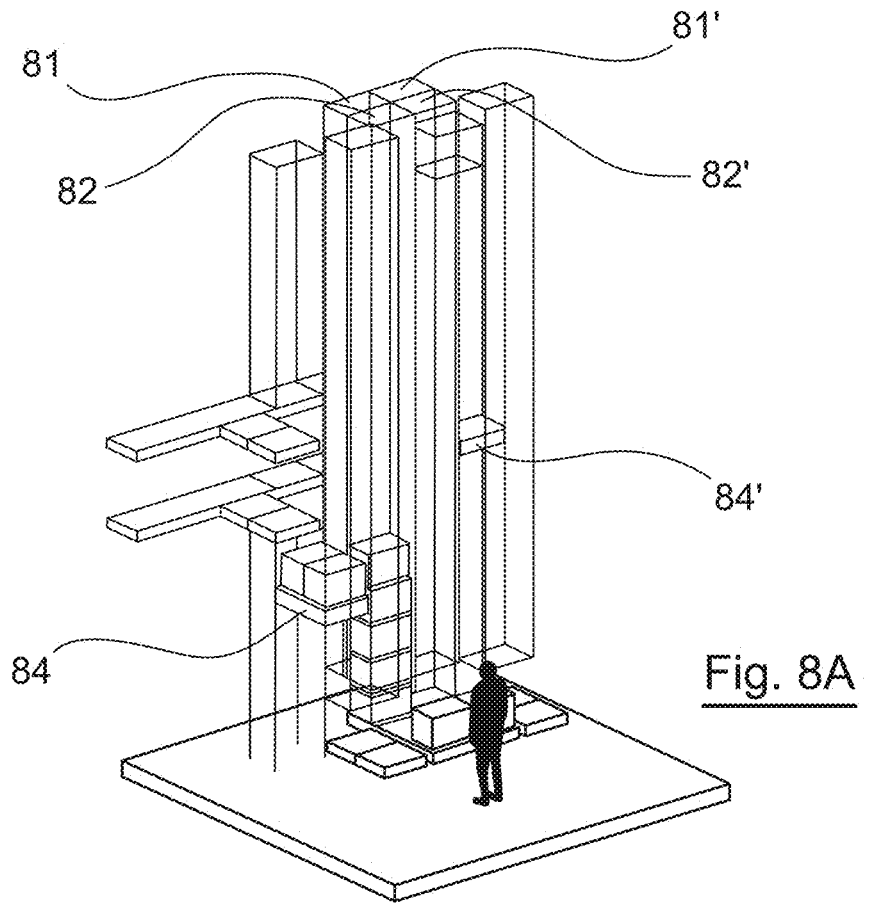
Figure 8B:
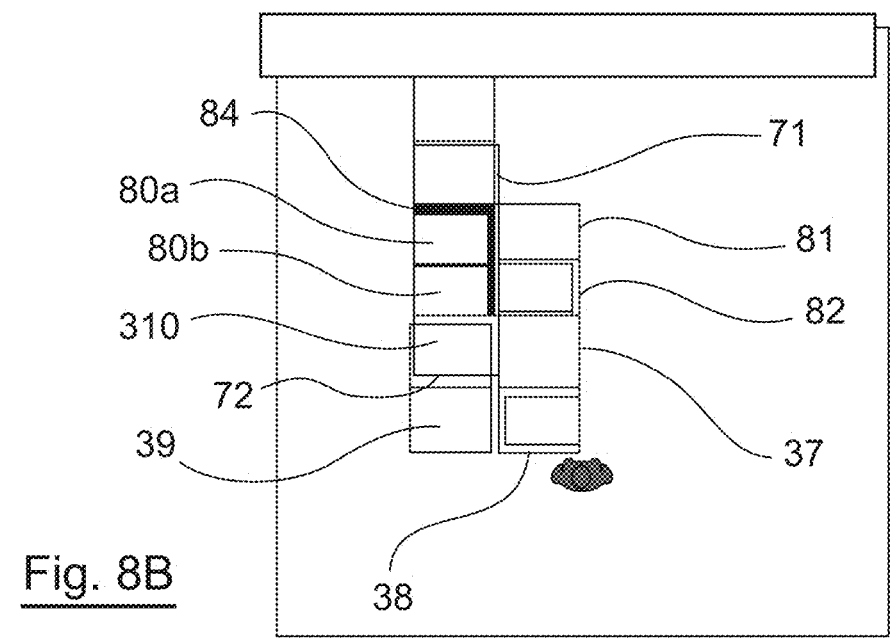
Figure 9A:
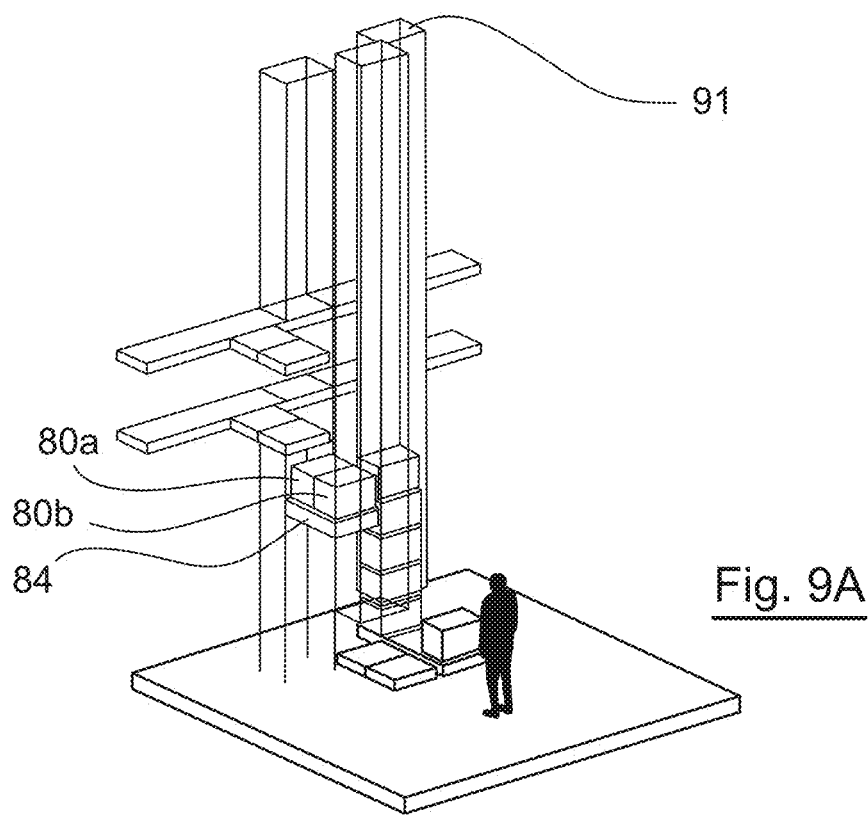
Figure 9B:
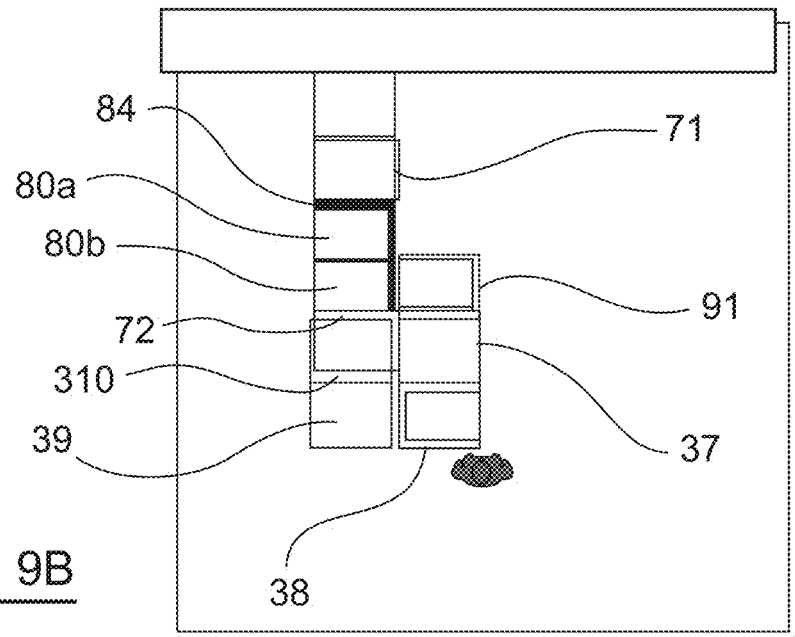
Figure 10:
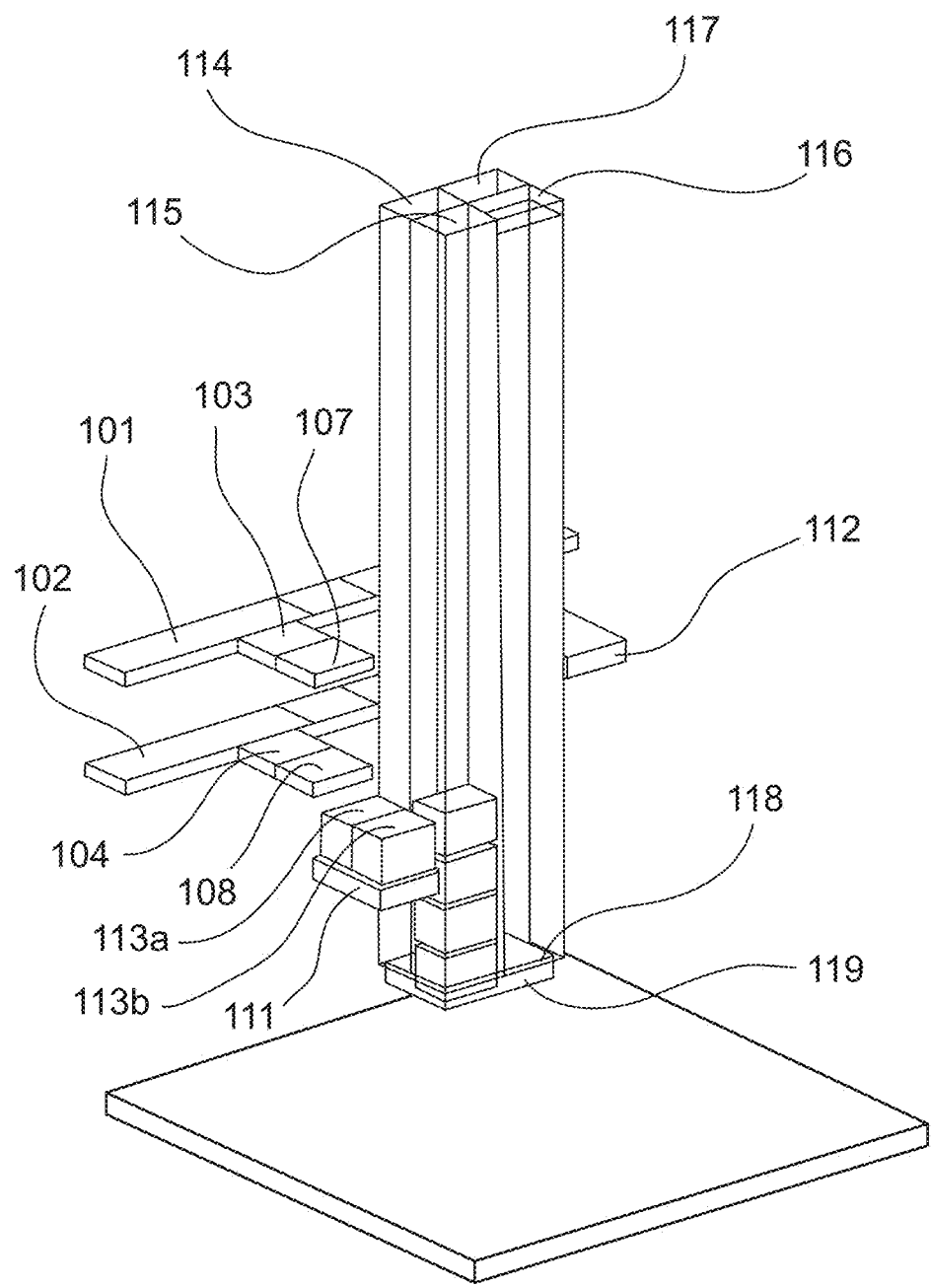

FIG. 5 presents a particular embodiment of each of the chutes included in the order-preparing station of FIGS. 3A and 3B;

FIG. 6 illustrates the making of the carousels for circulation of containers within the order-preparing station of FIGS. 3A and 3B;

FIGS. 7A and 7B present a full view in perspective and a partial top view of an order-preparing station according to a second embodiment of the invention;

FIGS. 8A and 8B present a full view in perspective and a partial top view of an order-preparing station according to a third embodiment of the invention;

FIGS. 9A and 9B present a partial view in perspective and a partial top view of an order-preparing station according to a fourth embodiment of the invention; and FIG. 10 shows a view in perspective of an order-preparing station according to a fifth embodiment of the invention.

6. DETAILED DESCRIPTION

In all the figures of the present document, the identical elements and steps are designated by a same numerical reference.

Figure 1:
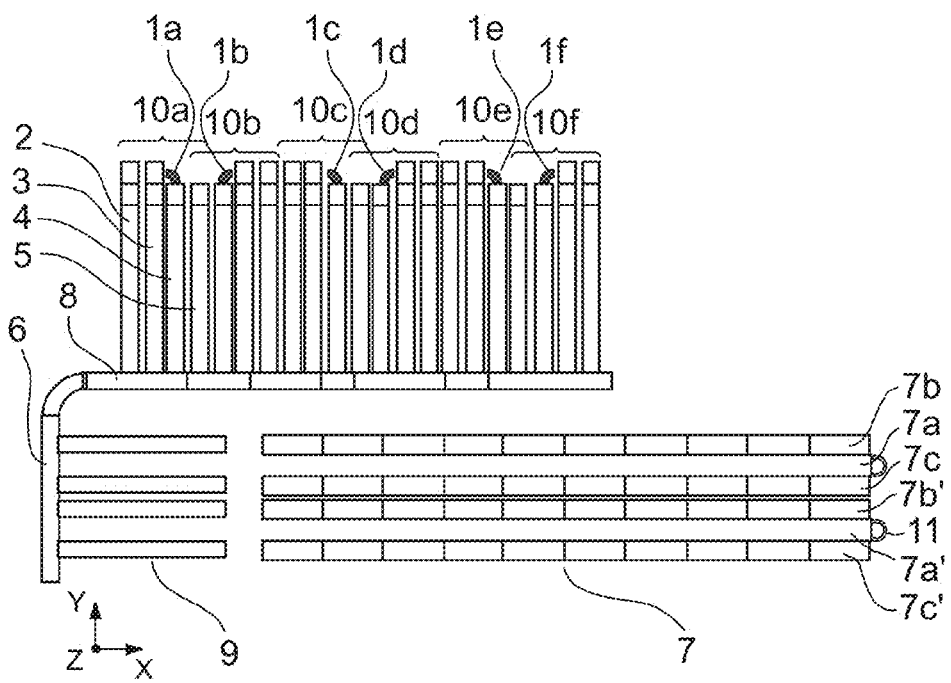
Figure 2:
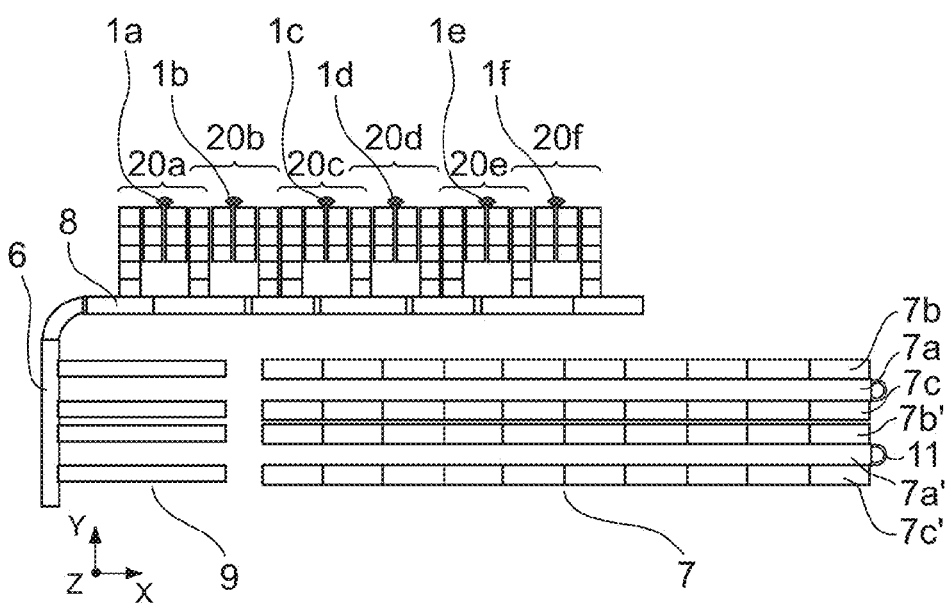
FIG. 2 shows a top view of an automated storage system comprising order-preparing stations according to a first embodiment of the invention.

FIG. 2 presents a top view of an automated storage system identical to that of FIG. 1 with the exception especially of the order-preparing stations (which are classic stations in FIG. 1 and stations according to a first embodiment of the invention in FIG. 2). FIG. 2 again shows therefore the storage depot 7 and the set of conveyors (comprising the three sub-sets referenced 8, 9 and 6, which take the storage containers from the storage depot up to the preparing stations and vice versa). The order-preparing stations according to the first embodiment of the invention are referenced 20a, 20b, 20c, 20d, 20e and 20f. They are each occupied by an operator 1a, 1b, 1c, 1d, 1e and 1f and are connected to the conveyors of the third sub-assembly 8. The structure and the working of these preparing stations are described in detail here below, with reference to FIGS. 3A, 3B and 4A to 4H. In the example of FIG. 2, the surface area needed for the six order-preparing stations according to the invention is about 42 m². This gives a gain of 58% of footprint as compared with the 100 m² needed for the six classic order-preparing stations of FIG. 1.

In the example illustrated in FIG. 2, in order to further reduce the footprint of the preparing stations, there is a pooling of certain elements (related for example to the return of the storage containers to the storage depot) between two neighboring stations (the case of the pairs of adjacent stations referenced (20a, 20b), (20c, 20d) and (20e, 20f)). In this case, the two adjacent stations of one of the above-mentioned pairs are configured symmetrically relative to each other, the common part forming an axis of symmetry.

As illustrated in FIGS. 3A and 3B, in the first embodiment of the invention, an order-preparing station comprises two circuits: the first for the storage containers and the second for the shipping containers. The two circuits are synchronized and controlled by the central management computer system (not shown) (also called a managing system) responsible for the managing of the entire automated storage system.

The first circuit, for the storage containers, is represented on the left-hand side of FIGS. 3A and 3B and comprises:

- an outbound conveyor 31 receiving storage containers coming from the storage depot 7;
- an entry base 32 equipped with a motorized roller conveyor. It receives containers arriving from the outbound conveyor 31;
- a post-entry buffer base 33, equipped with a motor-driven roller conveyor. It receives storage containers coming from the entry base 32;
- an elevator 34;
- a chute 35 which, through the elevator 34, receives storage containers coming from the post-entry buffer base 33. In FIG. 3A, four storage containers referenced 314a to 314d are in the chute;
- a reception base 36 equipped with a motor-driven roller conveyor combined with a vertical transfer system that is independent or uses the technology of the chute 35. It receives the storage containers coming out of the chute 35. In FIG. 3A, a storage container referenced 314e is located on the reception base 36;
- a pre-presentation buffer base 37, equipped with a motor-driven roller conveyor. It receives storage containers coming from the reception base 36;
- a presentation base 38 equipped with a motor-driven roller conveyor combined with a system for lateral transfer towards a pre-removal buffer base 39. It receives storage containers coming from the pre-presentation buffer base 37, and presents them to the operator (in FIG. 3A, a storage container referenced 314f is situated on the presentation base 38). It has for example a running surface height (RSH) equal to 750 mm;
- a pre-removal buffer base 39 equipped with a motor-driven roller conveyor. It receives storage containers coming from the presentation base 38;
- a removal base 310 equipped with a motor-driven roller conveyor. It receives storage containers coming from the pre-removal buffer base 39;
- a pre-exit buffer base 311 equipped with a motor-driven roller conveyor. Through the elevator 34, it receives storage containers coming from the removal base 310;
- an exit base 312 equipped with a motor-driven roller conveyor. It receives storage containers coming from the buffer base before exit 311;
- a return conveyor 313 receiving storage containers coming from the exit base 312 and returning them to the storage depot 7.

The elevator 34 is for example an alternating elevator with combined motions, equipped with a motor-driven roller conveyor combined with a transfer system (based for example on a collapsible-arm type technology) used to position the storage contents in the chute.

The chute 35 forms a means of vertical accumulation and sequential (step-by-step) distribution of storage contents. In the example of FIGS. 3A and 3B, it comprises superimposed mobile locations which can each receive and move a storage container downwards. One particular embodiment of this chute is described here below with reference to FIG. 5.

The second circuit, for shipping containers, is shown in the right-hand part of FIGS. 3A and 3B.

In the example shown, the second circuit is symmetrical with the first circuit and the outbound conveyor 31 and return conveyor 313 are common to the first and second circuits.

In one alternative embodiment, the outbound conveyor and return conveyor can be duplicated for reasons of flow. The outbound and return conveyors of the second circuit (for the shipping containers) are then distinct from the outbound and return conveyors of the first circuit (for the storage containers).

In the example of FIGS. 3A and 3B, the second circuit comprises, in addition to the outbound conveyor 31 and return conveyor 313, the following elements: an entry base 32', a post-entry buffer base 33', an elevator 34', a chute 35' (in FIG. 3A no shipping container is situated in the chute 35' of the second circuit), a reception base 36', a pre-presentation buffer base 37', a presentation base 38' (in FIG. 3A, a shipping container referenced 315 is situated in the presentation base 38' of the second circuit), a pre-removal buffer base 39', a removal base 310', a pre-exit buffer base 311' and an exit base 312'. These elements of the second circuit are not described in greater detail because they are identical to those of the first circuit, apart from the fact that they are used for shipping containers instead of storage containers.

Optionally, the presentation base 38 of the first circuit is equipped with a weight check system making it possible to check that the operator has picked the right goods (and in the right quantity) from the storage container present in this presentation base 38. Similarly, optionally, the presentation base 38' of the second circuit is equipped with a weight check system to check that the operator has placed the right goods (and in the right quantity) in the shipping container present in this presentation base 38'.

In the first embodiment illustrated in FIGS. 3A and 3B, the two circuits (one for the storage containers and the other for the shipping containers) are symmetrical with each other and each circuit comprises a single elevator which is a single-load elevator (i.e. conveys a single container) and a single chute. Other embodiments can be envisaged without departing from the framework of the present invention. It can be planned especially to:

- implement the invention in a single circuit (i.e. only for storage containers or shipping containers). In this case, the other circuit is done classically;
- use two (or more) chutes for a given circuit. Thus, the number of buffer locations and therefore the number of containers that can be accumulated before presentation to the operator is increased;
- make two (or more) elevators cooperate with a single chute within a given circuit.

Thus, the entry/exit rates of containers of this chute are increased;

- make two (or more) chutes cooperate with a same elevator, the chutes belonging to the same circuit or to different circuits. Thus, the number of elevators included in the preparing station is reduced;
- use (at least) one chute common to both circuits (i.e. a chute by which the storage containers and the shipping containers travel in transit). Thus, the use of this chute is optimized. Going back to the example of FIGS. 3A and 3B, if the chute 35' of the second circuit is also used to store storage containers, then the pre-presentation buffer base 37' of the second circuit is equipped for example with a lateral transfer system for lateral transfer towards the pre-presentation buffer base 37 of the first circuit so that the managing system can present the operator (at the presentation base 38 of the first circuit) with a storage container coming from the chute 35' of the second circuit. Conversely, the chute 35 of the first circuit can also be used to store shipping containers;
- use at least one elevator capable of simultaneously shifting several containers. Thus, the number of movements of the elevator is reduced. For example, several containers are horizontally adjacent (with the elevator at one level) and/or several containers are vertically adjacent (with the elevator at several levels);
- adapt the number of superimposed locations of each chute as a function of the quantity of containers to be accumulated (vertically) before sequential distribution to the operator;
- adapt the number of containers that can be stored in each chute location.

Referring now to FIGS. 4a to 4H, the working of the order-preparing station of FIGS. 3A and 3B is presented. More specifically, a description is provided of the working of the first circuit (for the storage containers) through the path followed by a storage container referenced 40. The working of the second circuit (for the shipping containers) is not described in detail since it works like the first circuit (these two circuits are symmetrical with each other and include identical elements).

In FIG. 4A, the container 40 is present on the elevator 34 which is in position facing the post-entry buffer base 33. It is assumed that the container 40 is first reached by the outbound conveyor 31 (coming from the storage depot 7) and has passed by the entry base 32 and then the post-entry buffer base 33.

In FIG. 4B, the elevator 34 is lowered and is situated in a position facing a free location of the chute 35 (in this case this is the location occupying the fifth position from the bottom, the locations situated at the four lowest positions being occupied by containers referenced 41 to 44 respectively). This is managing system that manages the use of the locations of the chute 35. For example, the entry base 32 (or the post-entry buffer base 33) is equipped with a system for reading an identifier borne by a storage container present on this base (and coming from the outbound conveyor 31). When it receives the identifier read by this reading system, the managing system selects one of the free locations of the chute 35 as a function of the identifier read and a predetermined sequence defining the order in which the storage containers must exit the chute 35, this predetermined sequence being possibly recomputed during the conveying of the containers.

Then the managing system steers the elevator 34 to make this given storage container enter the selected location.

In FIG. 4C, the container 40 has been loaded into the chute 35 (in the location occupying previously free and occupying the fifth position starting from the bottom).

In FIG. 4D, the container 40 has exited the chute 35 and is present on the reception base 36. This is done in five steps: in the four first steps, the location occupied by the container 40 has passed, in the chute 35, from the fifth to the first position starting from the bottom; then, in the fifth step, the container 40 exits this location and is placed on the reception base 36.

In FIG. 4E, the container 40 is present on the presentation base 38. It has preliminarily passed by the pre-presentation buffer base 37.

In FIG. 4F, the container 40 is present on the elevator 34. It has preliminarily passed by the pre-removal buffer base 39 and then the removal base 310.

Two cases are then possible, corresponding respectively to FIGS. 4G and 4H.

In FIG. 4G (the case of repositioning in sequence), the container 40 is present on the elevator 34 which is in position facing a free location of the chute 35 so that the container 40 is repositioned therein (in this example it is again the location occupying the fifth position starting from the bottom). It is the managing system that manages the use of the locations of the chute 35 and makes it possible to leave certain locations deliberately free in order to be able to reposition a container (sequentially) therein after it has been presented to the operator.

In FIG. 4H (the case of a return to the storage depot), the container 40 is present on the elevator 34 which is in position facing the pre-exit buffer base 311 so that the container 40 is placed therein and then passes by the exit base 312 before going back by the return conveyor 313 (towards the storage depot 7).

Referring now to FIG. 5, we present a particular embodiment of a chute (for example the one referenced 35) included in the order-preparing station of FIGS. 3A and 3B. The chute 35 includes two notched belts 51, 52 equipped with pegs 53 and driven simultaneously in rotation in the sense of the arrows referenced 55 and 56. It also comprises a system 54 for synchronizing the pegs 53 of both belts. In the peg descent phase, each pair of pegs facing each other (each mounted on one of the two belts) forms a location of the chute. This location is therefore mobile from top to bottom of the chute, for example in 500 mm steps. In this location, it is possible to place a container 57, 58 coming from the elevator 34. When they reach the bottom of the chute, the pegs of a pair of pegs move apart from each other, thus releasing (at the reception base 36) the container that they were carrying.

Other embodiments of the chute can be envisaged without departing from the framework of the present invention. It is possible especially to provide a system of vertical movement of rigid nacelles (each corresponding to a location of the chute).

As illustrated in FIG. 6, in one variant of the invention, a carousel for the circulation of containers are made within the order-preparing station of FIGS. 3A and 3B.

To make a first carousel for the circulation of storage containers, the managing system appropriately commands the container-moving mechanisms (motor-driven roller conveyor and possibly lateral transfer system) with which the following elements of the first circuit are equipped (used for the storage containers): the pre-presentation buffer base (in FIG. 6 it is concealed by the container referenced 60), the presentation base 38, the pre-removal buffer base 39 and the removal base 310. This first carousel for example enables the storage containers to be made to rotate in the sense of the arrow referenced 61. In one variant, the rotation is done in reverse. In another variant, both senses of rotation are used. This first carousel enables the operator (or an automaton) to be presented several times with a given storage container 60 without making the container pass again through the chute 35.

To make a second carousel for the circulation of shipping containers, the managing system appropriately commands the container-moving mechanisms (motor-driven roller conveyor and possibly a lateral transfer system) with which the following elements of the second circuit are equipped (used for the shipping containers): the pre-presentation buffer base 37', the presentation base 38', the pre-removal buffer base 39' and the removal base 310'. This second carousel makes it possible, for example, to make the shipping containers rotate in the sense of the arrow referenced 62. In one variant, the rotation is done in the reverse sense. In another variant, both senses of rotation are used. This second carousel makes it possible to present the operator (or an automaton) with a given shipping container 63 several times without making it pass again through the chute 35'.

Depending on whether each of these first and second carousels is used or not used by the managing system, various order-preparing modes are possible, and especially the following "one for one" type order-preparing modes (a storage container and a shipping container are presented simultaneously to the operator):

a first mode in which, for a given shipping container presented to the operator, the first carousel makes it possible (by making the storage containers containing the goods to be picked the operator go round) to present the operator with several storage containers successively. For example, a storage container is presented for each line of the list of orders associated with this given shipping container;

a second mode in which, for a given storage container presented to the operator, the second carousel makes it possible (by making the shipping containers, in which goods picked up by the operator have to be placed, go round) to present the operator with several shipping containers successively. For example, at the same time as the given storage container, several shipping containers are presented successively, each associated with an order list having one line pertaining to a type of goods present in the given shipping container;

a third mode in which, for a given storage container and shipping container, the first carousel makes it possible (by making the storage containers go round) to present the operator with the given storage container and the second carousel makes it possible (by making the shipping containers go round) to present the given shipping container to the operator.

Classically, the order book comprises a plurality of order lists, each list being associated with a shipping container. Each line associates:

an order number (corresponding to the list to which this line belongs and therefore to a shipping container);

a reference number (corresponding to a storage container storing the type of goods desired); and a quantity (corresponding to a number of goods of the desired type to be picked).

For implementing the first mode, the managing system reorganizes the lines of the order book consisting, in a first step, in sorting out these lines by order number. Thus, after reorganization, all the lines having the same order number will follow one another (this enables the storage containers to go round for a same shipping container). Optionally, the reorganization comprises a second step in which, while maintaining the grouping of lines by order number, two lines having different order numbers but the same reference number are placed after each other (this reduces the number of movements of the storage containers).

Table A here below presents an example of a order book after the first step of reorganization to implement the first mode.

| Line number | Reference number | Order number | Quantity |
|---|---|---|---|
| 21 | 12 | 8 | 2 |
| 20 | 12 | 7 | 1 |
| 19 | 4 | 7 | 5 |
| 18 | 1 | 6 | 4 |
| 17 | 4 | 6 | 4 |
| 16 | 5 | 6 | 5 |
| 15 | 9 | 6 | 5 |

-continued

| Line number | Reference number | Order number | Quantity |
|---|---|---|---|
| 14 | 13 | 6 | 1 |
| 13 | 13 | 5 | 4 |
| 12 | 1 | 5 | 4 |
| 11 | 6 | 5 | 5 |
| 10 | 11 | 5 | 1 |
| 9 | 5 | 5 | 5 |
| 8 | 2 | 4 | 1 |
| 7 | 5 | 4 | 3 |
| 6 | 8 | 4 | 5 |
| 5 | 15 | 3 | 4 |
| 4 | 14 | 3 | 3 |
| 3 | 7 | 2 | 1 |
| 2 | 1 | 2 | 1 |
| 1 | 11 | 1 | 3 |

Table B here below presents an example of an order book after the second step of reorganization for implementing the first mode (the column "Quantity" has no entries).

| Line number | Reference number | Order number | Quantity |
|---|---|---|---|
| 21 | 12 | 8 | |
| 19 | 12 | 7 | |
| 20 | 4 | 7 | |
| 17 | 4 | 6 | |
| 18 | 1 | 6 | |
| 16 | 5 | 6 | |
| 14 | 9 | 6 | |
| 15 | 13 | 6 | |
| 13 | 13 | 5 | |
| 11 | 6 | 5 | |
| 10 | 11 | 5 | |
| 9 | 5 | 5 | |
| 12 | 1 | 5 | |
| 2 | 1 | 2 | |
| 3 | 7 | 2 | |
| 7 | 5 | 4 | |
| 8 | 2 | 4 | |
| 6 | 8 | 4 | |
| 5 | 15 | 3 | |
| 4 | 14 | 3 | |
| 1 | 11 | 1 | |

To implement the second method, the managing method carries out a reorganization of the lines of the order book in which these lines are sorted out by reference number (since the goal is to make the shipping containers go round for a same storage container). Thus, after reorganization, all the lines having the same reference number will follow each other.

Table C here below presents an example of an order book after the reorganization for implementing the second mode (the column "Quantity" does not contain any entries).

| Line number | Reference number | Order number | Quantity |
|---|---|---|---|
| 18 | 1 | 2 | |
| 12 | 1 | 5 | |
| 2 | 1 | 6 | |
| 8 | 2 | 4 | |
| 19 | 4 | 6 | |
| 17 | 4 | 7 | |
| 16 | 5 | 4 | |
| 9 | 5 | 5 | |
| 7 | 5 | 6 | |
| 11 | 6 | 5 | |
| 3 | 7 | 2 | |

-continued

| Line number | Reference number | Order number | Quantity |
|---|---|---|---|
| 6 | 8 | 4 | |
| 15 | 9 | 6 | |
| 10 | 11 | 1 | |
| 1 | 11 | 5 | |
| 21 | 12 | 7 | |
| 20 | 12 | 8 | |
| 14 | 13 | 5 | |
| 13 | 13 | 6 | |
| 4 | 14 | 3 | |
| 5 | 15 | 3 | |

Optionally, the managing system can dynamically switch from one order-preparing mode to another. The above description can be transposed to the case in which an operator is replaced by an automaton.

Referring now to FIGS. 7A and 7B, we present an order-preparing station according to a second embodiment of the invention. FIG. 7A is complete, the first and second circuits being represented (one to the left for the storage containers and the other to the right for the shipping containers). FIG. 7B is partial, only the first circuit being shown (to the left). This second embodiment is distinguished from the first one (shown in FIGS. 3A and 3B) solely in that:

each circuit further comprises two buffer storage structures (or racks) (referenced 71 and 72 for the first circuit, 71' and 72' for the second circuit) comprising fixed locations each capable of receiving one storage container; and the managing system enabling the managing of the elevator 34 in order to temporarily store storage containers in these buffer storage structures.

Each rack makes it possible to keep the containers concerned by preparation in the near future on standby. A rack is equipped for example with free rollers, chained by a belt. The elevator 34 is equipped with a collapsible friction-based drive system. During the depositing or removal of a container onto or from the rack, the elevator applies its drive system to the chained rollers of the rack. In one variant, each location of the rack is equipped with a motor-driven roller conveyor which is controlled by a managing system during the placing or removal of a container in or from the rack. The number and the height of the racks are chosen according to the need for buffer locations.

Variants of this second embodiment can be envisaged without departing from the framework of the present invention. It is possible to use only one rack or more than two racks.

Referring now to FIGS. 8A and 8B, we present an order-preparing station according to a third embodiment of the invention. FIG. 8A is complete, the first and second circuits being represented (one to the left for the storage containers and the other to the right for the shipping containers). FIG. 8B is partial, only the first circuit being represented (to the left). This third embodiment is distinguished from the second one (presented in FIGS. 7A and 7B) solely in that each circuit has two chutes 81, 82 and 81', 82' and the elevator 84 and 84' is a dual-load elevator. This elevator is used to transport two containers 80a, 80b in horizontally adjacent positions. Each of these adjacent positions enables the transfer of a container to one of the two chutes.

Referring now to FIGS. 9A and 9B, we present an order-preparing station according to a fourth embodiment of the invention. FIGS. 9A and 9B are partial, only the first circuit being represented (to the left). This fourth embodiment is distinguished from the third embodiment (presented in FIGS. 8A and 8B) only in that, in each circuit, there is only one chute 91. The elevator 84 is a dual-load elevator and is used to transport two containers 80a, 80b in horizontally adjacent positions. Only one of the two adjacent positions enables the transfer of a container to the chute 91. The elevator is equipped with a motor-driven roller conveyor enabling a container to be made to pass from one of the adjacent positions to the other and thus to enable it to be transferred to a location of the chute.

Referring now to FIG. 10, we present an order-preparing station, according to a fifth embodiment of the invention enabling a layered palletization (i.e. enabling the placing on a pallet or another support of one or more layers of storage containers). Unlike in the other embodiments described here above, there are no operations for removing goods from the storage containers. Indeed, the storage containers (in which goods are located) are placed as such on the pallet without being opened.

A first circuit, for the storage containers, comprises:

two outbound conveyors 101, 102 each receiving storage containers coming from the storage depot 7;

four entry bases (of which only two can be seen, referenced 103 and 104, the other two being concealed by the chutes), each being equipped with a motor-driven roller conveyor and receiving containers arriving from one of the outbound conveyors (there are two entry bases per outbound conveyor);

four post-entry buffer bases (only two of which can be seen, referenced 107 and 108, the other two being concealed by chutes), each being equipped with a motor-driven roller conveyor and receiving storage containers coming from one of the four entry bases;

two elevators 111, 112, each being a dual-load elevator and enabling the transportation of two containers 113a, 113b in horizontally adjacent positions;

four chutes 114 to 117, each receiving storage containers coming from one of the positions of one of the elevators.

In the example illustrated, the chutes referenced 114 and 115 receive storage containers by means of the elevator referenced 111, while the chutes referenced 116 and 117 receive storage containers by means of the elevator referenced 112. The chutes are for example of the type described here above (see FIG. 5). Each one forms a means for the vertical accumulation and sequential (step by step) distribution of storage containers.

A second circuit, for the pallets, comprises:

a loading base 119, comprising a pallet support equipped with an elevator table (to lower the pallet 118 down before loading a new layer of storage containers thereon), motor-driven rollers (to bring an empty pallet to the support and then remove it when it is loaded) and an aligning guide system (to bring a layer of storage containers loaded on a pallet to their final dimensions, i.e. to eliminate the clearance between containers and enable the normal use of the pallet);

an entry means (not shown) enabling the empty pallets to be brought up to the loading base 119. The arrival of the empty pallets is made for example by means of an accumulation pallet conveyor system which makes it possible to keep empty pallets on standby;

an exit means (not shown) used to remove the loaded pallets from the loading base 119. For example, when the pallet is constituted (i.e. loaded) it is removed by means of a conveyor for removing full pallets and then conveyed into another zone where it can be shipped.

For example, if we consider a 800×1200 mm standard format pallet, the station illustrated in FIG. 10 enables the loading (simultaneously or not simultaneously) of four storage containers (each going out of one of the four chutes 114 to 117) with a format of 600×400 mm per layer.

In one variant, we still consider a 800×1200 mm standard format pallet but storage containers with a 300×400 mm format. Each chute has locations enabling the simultaneous receiving of two adjacent storage containers (giving 600×400 mm for the two cumulated containers). Each elevator has a four-fold load and enables the transportation of four storage containers to horizontally adjacent positions. Thus, in this variant, the station enables the loading (simultaneously or not simultaneously) of eight storage containers (exiting two by two from each of the four chutes) per layer.

Other variants of the palletization station (with chutes and elevators) can be envisaged without departing from the framework of the present invention. In particular, it is possible to adapt the number of chutes, the number of elevators, the number of containers that can be stored in each location of the chute, the number of containers that can be transported simultaneously by each elevator, etc.

The invention claimed is:

1. A unit comprising:

a station for preparing orders, which is managed by a managing system and possesses a first circuit comprising:

a first outbound conveyor configured to receive containers for storing goods, and a first means for accumulating a determined quantity of storage containers received by the first outbound conveyor;

said first means for accumulating comprises:

at least one first chute comprising superimposed mobile locations, wherein each mobile location is capable of receiving and moving at least one storage container downwards; said at least one first chute forming a means for vertically accumulating and sequentially distributing storage containers preliminarily placed in the mobile locations in a predetermined order; and at least one first elevator, capable of moving vertically along said at least one first chute up to each of the mobile locations of said at least one first chute;

wherein the station for preparing orders further comprises a means for reading an identifier carried by a given storage container coming from the first outbound conveyor, and wherein the managing system is configured to:

select one of the mobile locations of said at least one first chute, as a function of the identifier read and of a predetermined sequence, wherein said predetermined sequence defines an order in which the storage containers must exit said at least one first chute; and manage said at least one first elevator in order to make the given storage container enter the selected mobile location.

2. The unit according to claim 1, wherein the first circuit further comprises a means of palletization for placing storage containers exiting said at least one first chute on pallets or other supports.

3. Unit according to claim 1, wherein the station for preparing orders comprises at least one first buffer storage structure, said first buffer storage structure comprising fixed locations, wherein each fixed location is each capable of receiving at least one storage container; and wherein the managing system is adapted to manage said at least one first elevator in order to temporarily store storage containers in said at least one first buffer storage structure.

4. The unit according to claim 1, wherein each elevator can transport at least two containers side by side and/or at least two superimposed containers.

5. The unit according to claim 1, wherein at least one chute cooperates with at least two elevators.

6. The unit according to claim 1, wherein at least one elevator cooperates with at least two chutes.

7. The unit according to claim 1, wherein said at least one chute comprises two notched belts equipped with synchronized pegs.

8. The unit according to claim 1, wherein each conveyor is placed in an overhead position, at least two meters from the ground.

9. The unit according to claim 1, wherein the first circuit further comprises:
- first means for presenting storage containers exiting said at least one first chute to an operator or a robot;
- first means of removal, enabling the transfer to said at least one first elevator of selected storage containers after they have been presented to the operator or the robot;
- a first return conveyor configured to receive storage containers coming from the first means of removal via said at least one first elevator.

10. The unit according to claim 9, wherein the station for preparing orders is configured to manage said at least one first elevator in order to leave free one of the mobile locations of said at least one first chute and to make a storage container that is coming from the first removal means enter the mobile location that is left free.

11. The unit according to claim 9, wherein the managing system is configured to manage the first means for presenting so that they form a first carousel for circulation of storage containers, the first carousel being configured to present a given storage container to the operator or the robot at least twice without making the same given storage container pass again through said at least one first chute.

12. The unit according to claim 11, wherein the managing system is configured to adopt an order-preparing mode belonging to the group comprising:
- a first mode, wherein a same shipping container is presented to the operator or the robot, and wherein the first carousel is configured to present several storage containers successively to the operator or the robot;
- a second mode, wherein a same storage container is presented to the operator or the robot, and wherein the second carousel is configured to present several shipping containers successively to the operator or the robot; and
- a third mode, wherein the first carousel is configured to present a given storage container to the operator or the robot, and wherein the second carousel is configured to present a given shipping container to the operator or the automaton.

13. The unit according to claim 9, wherein the station for preparing orders possesses a second circuit comprising:
- a second outbound conveyor receiving goods shipping containers;
- a second means for accumulating a determined quantity of shipping containers received by the second outbound conveyor, said second accumulating means comprising:
  at least one second chute comprising superimposed mobile locations, wherein each mobile location can receive and move at least one shipping container downwards, said at least one second chute forming a means for vertically accumulating and sequentially distributing shipping containers preliminarily placed in the mobile locations;
  at least one additional elevator, wherein each additional elevator is capable of moving vertically along said at least one first chute up to each of the mobile locations of said at least one second chute;
- a second means for presenting the operator or the robot with shipping containers exiting said at least one second chute.

14. The unit according to claim 13, wherein, among said at least one first chute and said at least one second chute, at least one shared chute receives storage containers and shipping containers,
and wherein the managing system is configured to manage the first and second means for presenting so that they cooperate to present the operator or the robot with storage containers and shipping containers exiting said at least one shared chute.

15. The unit according to claim 13, wherein the second circuit further comprises:
- second means of removal, enabling the transfer to said at least one additional elevator of at least certain of the shipping containers after they have been presented to the operator or the robot; and
- a second return conveyor receiving shipping containers coming from second means of removal via said at least one additional elevator.

16. The unit according to claim 13, wherein the managing system is configured to manage the second means for presenting so that they form a second carousel for the circulation of shipping containers, making it possible to present a given shipping container to the operator or the robot at least twice, without making said given shipping container pass again through said at least one second chute.

17. A system of automated storage, comprising:
- a storage depot; and
- at least one order-preparing unit comprising:
  a station for preparing orders, which is managed by a managing system and possesses a first circuit comprising:
  a first outbound conveyor configured to receive containers for storing goods, and
  a first means for accumulating a determined quantity of storage containers received by the first outbound conveyor;
  said first means for accumulating comprises:
  at least one first chute comprising superimposed mobile locations, wherein each mobile location is capable of receiving and moving at least one storage container downwards; said at least one first chute forming a means for vertically accumulating and sequentially distributing storage containers preliminarily placed in the mobile locations in a predetermined order; and
  at least one first elevator capable of moving vertically along said at least one first chute up to each of the mobile locations of said at least one first chute;
  wherein the station for preparing orders further further comprises a means for reading an identifier carried by a given storage container coming from the first outbound conveyor, and
  wherein the managing system is configured to:
  select one of the mobile locations of said at least one first chute as a function of the identifier read and of a predetermined sequence, wherein said predetermined sequence defines an order in which the storage containers must exit said at least one first chute; and
  manage said at least one first elevator in order to make the given storage container enter the selected mobile location.

* * * * *